J. L. WALKER.
SHIPPING CASE.
APPLICATION FILED APR. 18, 1922.

1,437,574.

Patented Dec. 5, 1922.

J. L. Walker, Inventor

By C. A. Snow & Co.
Attorney

Patented Dec. 5, 1922.

1,437,574

UNITED STATES PATENT OFFICE.

JOSEPH L. WALKER, OF BATON ROUGE, LOUISIANA, ASSIGNOR TO K-D BARREL AND HAMPER CO., OF BATON ROUGE, LOUISIANA.

SHIPPING CASE.

Application filed April 18, 1922. Serial No. 554,584.

*To all whom it may concern:*

Be it known that I, JOSEPH L. WALKER, a citizen of the United States, residing at Baton Rouge, in the parish of East Baton Rouge and State of Louisiana, have invented a new and useful Shipping Case, of which the following is a specification.

This invention relates to shipping cases or crates for vegetables, fruits and the like.

The object of the invention is to provide a vessel of this character so constructed that the contents thereof will be effectively ventilated, and yet all possibility of their being bruised or cut will be prevented.

Another object is to provide a case or box composed of spaced staves having their inner edges rounded to prevent injury to the contents, and having end closures with ventilating openings, the edges of which on the inner faces of the closures are also rounded for the same purpose.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
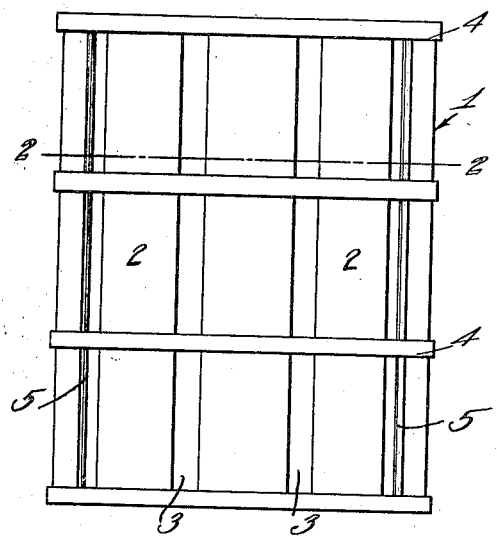
Figure 1 represents a side elevation of a crate in the form of a barrel constructed in accordance with this invention.
Figure 2:
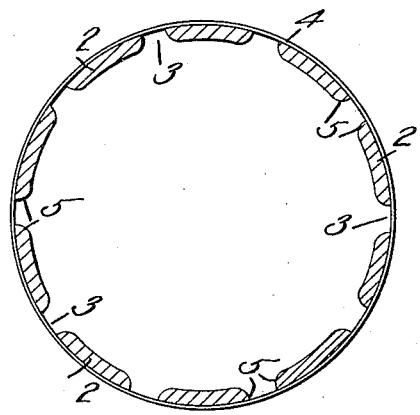
Fig. 2 is a transverse section thereof taken on the line 2—2 of Fig. 1.
Figure 3:
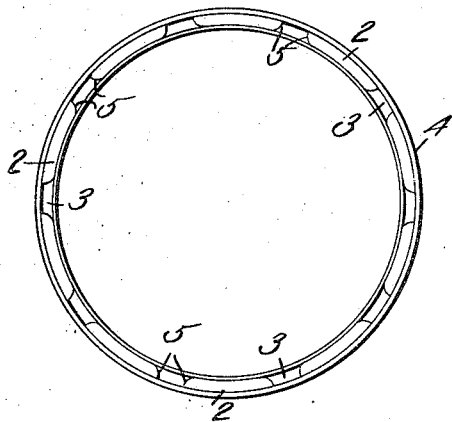
Fig. 3 is an end elevation thereof.
Figure 4:
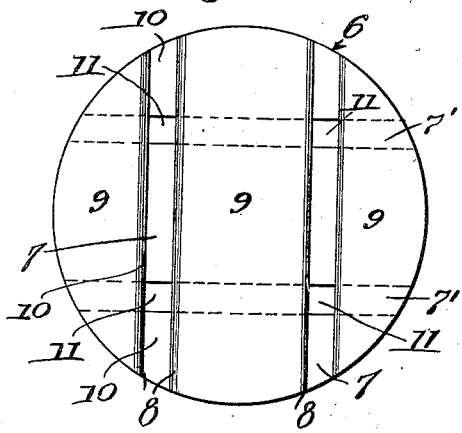
Fig. 4 is a bottom plan view of one of the end closures.
Figure 5:
Fig. 5 is a detail edge view of said closure.

In the embodiment illustrated, a crate in the form of a barrel 1 is shown composed of a plurality of staves 2 having ventilating apertures 3 between them, and which are connected by hoops 4 in the usual way. These staves 2 have their inner edges rounded as shown at 5 to avoid bruising or cutting of fruit or vegetables packed in the barrel and the consequent decay of vegetables and fruits so injured.

This barrel 1 is equipped with end closures, one of which is shown at 6 and which is composed of two plies or layers each formed of a plurality of spaced sections 9 and 10 respectively, the opposed edges of the sections being rounded as shown at 8 with the spaces between the sections of one ply intersecting those of the other to provide ventilating openings 11 at points spaced from the perimeter of the head, these spaces also forming grooves 7 and 7' in the opposed faces of the head or closure and arranged in planes at right angles to each other. This arrangement of the sections of the respective plies avoids the formation of openings at the ends of the grooves such as would be liable to bruise the contents of the barrel and be closed by the contents overlying them.

While the invention is shown applied to a barrel, it is of course to be understood that it may be applied equally well to any form of packing case composed of spaced slats or one having ventilating openings of any kind therein, the rounding of the corners of the ventilating openings constituting the gist of the invention.

I claim:—

A packing case of the class described including an end closure composed of two superposed plies, each formed of a plurality of spaced sections, the opposite edges of which are rounded, the sections of one ply being arranged in a plane at right angles to those of the other ply whereby the spaces between the sections of the respective plies intersect each other and form ventilating openings spaced from the perimeter of the closure, the closure being imperforate in the area adjacent its perimeter.

In testimony that I claim the foregoing as my own, I have hereto affixed my signature in the presence of two witnesses.

JOSEPH L. WALKER.

Witnesses:
NOVA SHIRCLIFF,
JESS JOHNSON.